2,349,602

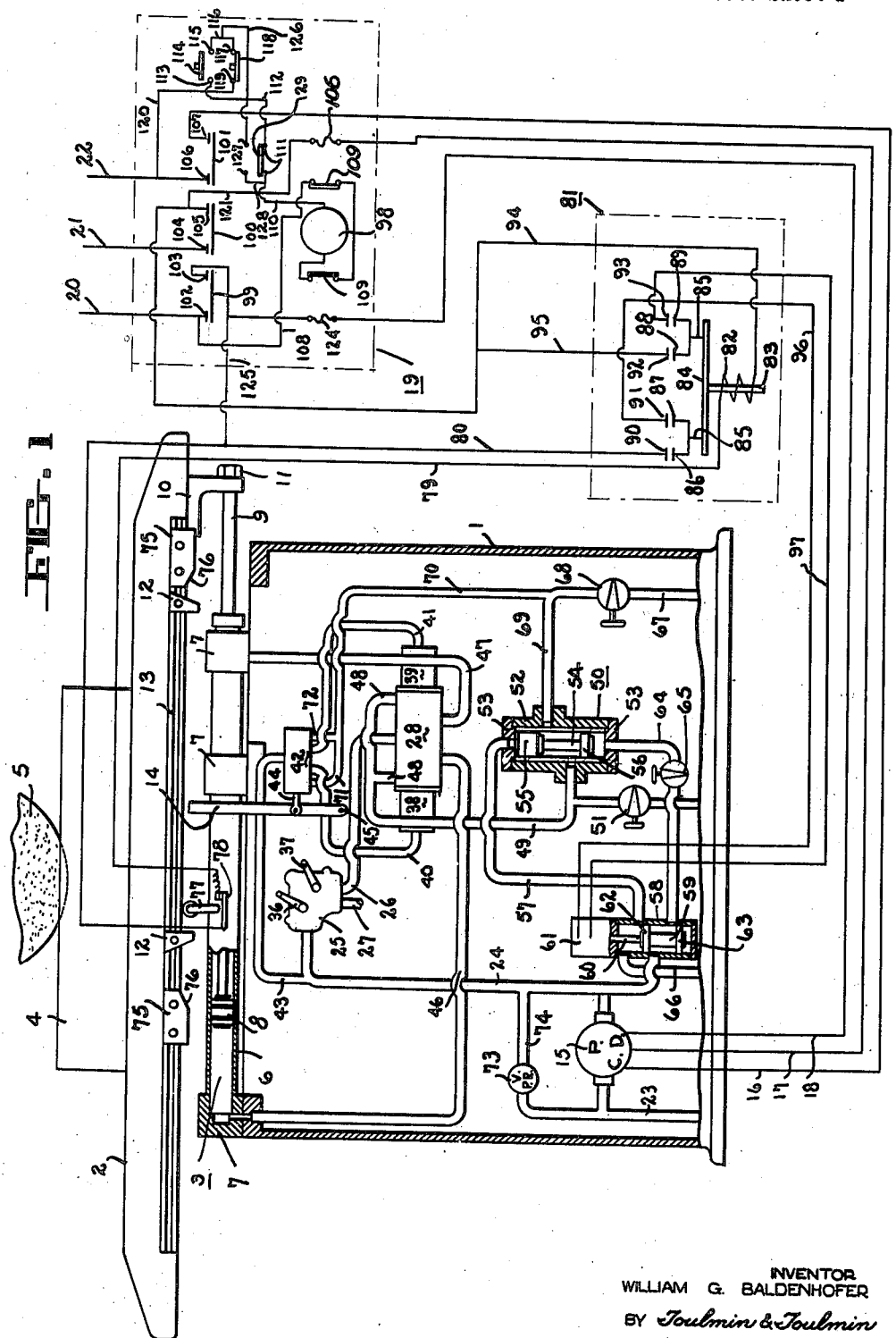
May 23, 1944.  W. G. BALDENHOFER  2,349,602
HYDRAULIC SYSTEM FOR MACHINE TOOLS
Filed March 9, 1942  2 Sheets-Sheet 1
INVENTOR
WILLIAM G. BALDENHOFER
BY Toulmin & Toulmin
ATTORNEYS

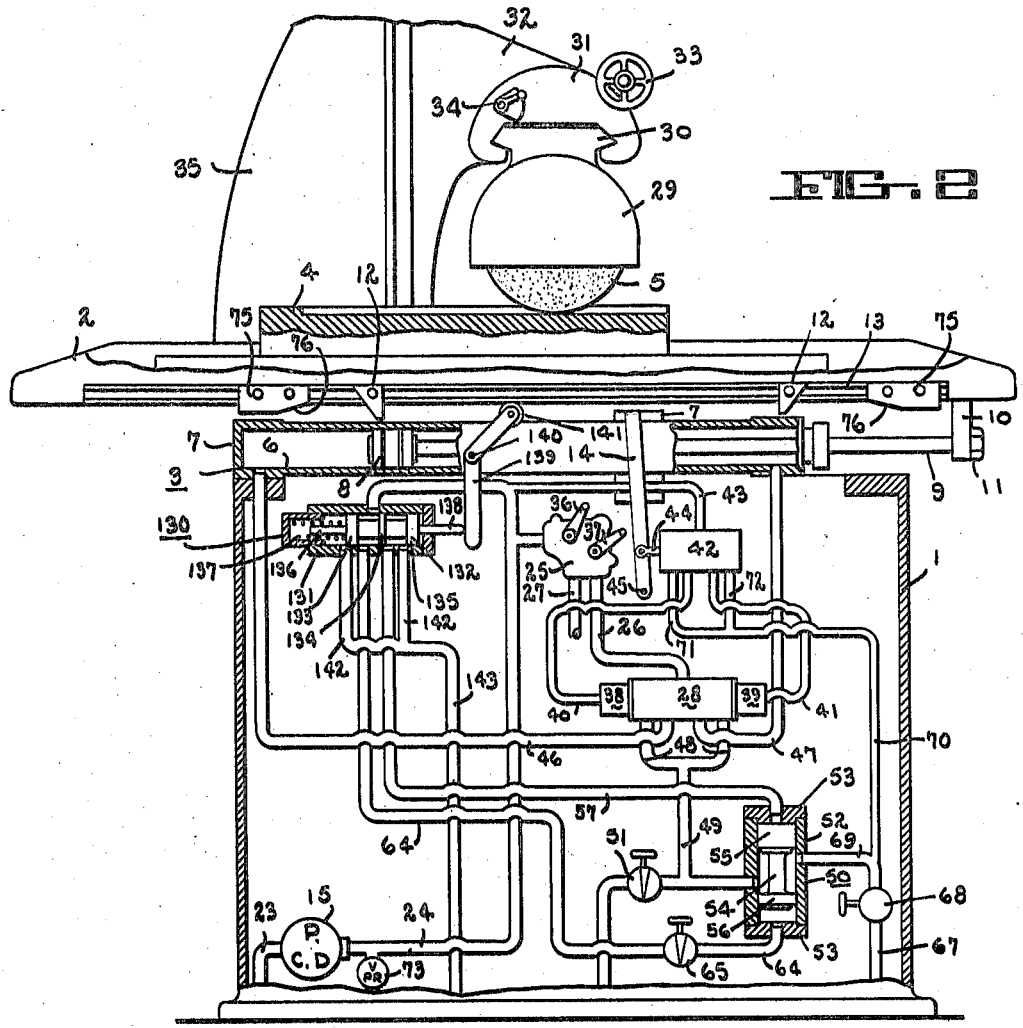
May 23, 1944. W. G. BALDENHOFER 2,349,602
HYDRAULIC SYSTEM FOR MACHINE TOOLS
Filed March 9, 1942 2 Sheets-Sheet 2
INVENTOR
WILLIAM G. BALDENHOFER
BY Toulmin & Toulmin
ATTORNEYS Patented May 23, 1944

UNITED STATES PATENT OFFICE 2,349,602

HYDRAULIC SYSTEM FOR MACHINE TOOLS

William G. Baldenhofer, Springfield, Ohio, assignor to The Thompson Grinder Company, Springfield, Ohio, a corporation of Ohio Application March 9, 1942, Serial No. 433,953

6 Claims. (Cl. 51—233)

The present invention relates to machines having power-driven reciprocatory parts, and more particularly to hydraulically-operated grinding machines and other mechanism for shaping material to a predetermined form or dimension.

In the case of heavy grinding machines, particularly those of the high precision type, the table is usually actuated by a hydraulic piston, and inasmuch as the table operates at a fairly fast speed it is necessary to slow the moving parts down before they reach the end of their travel. Any over-travel, due to table momentum, may cause severe damage to the operating cylinders, piston rods and their attachments. This danger is even more pronounced when the cylinder is working on a blind end spline, i. e. a groove which is closed at one end, or where a wheel dresser is secured to the table and may strike the grinding wheel if the table were moved through an excessive distance.

The primary object of the invention is to provide improved mechanism for retarding a heavy moving mass of metal in any desired amount, and at any predetermined position in its travel.

Another object is to provide a hydraulic system including automatically operating valves for diminishing the speed of a heavy reciprocatory mass of metal at any desired point in its travel.

Still another object is to provide an improved mechanism operating in connection with a hydraulically-actuated reciprocatory table for retarding the movement of the table immediately prior to the reversal of travel, or at any other time.

Another object is to provide an improved hydraulic system of the type referred to, by which the retarding effects on the table may be brought about automatically and in an adjustable manner.

A more general object is to provide mechanism of simplified and efficient design for operating in connection with a grinder of the hydraulically-actuated table type, and serving to retard the table or other reciprocatory part in any desired amount.

These objects are carried out, in brief, by providing a fluid throttling valve connected either in the pressure or exhaust side of the table-operating cylinder, and automatically made effective when the table has reached a predetermined point in its travel.

In the drawings:

Figure 1 represents a side elevational view of a typical grinding machine with the bed in section, and containing the table-actuating structure and the improved table-retarding mechanism. The electrical control circuit is also shown in Figure 1.

Figure 2 is a view similar to Figure 1, but showing a modified form of the retarding mechanism.

Figure 3 illustrates the improved retarding mechanism positioned within the hydraulic circuit differently than in Figures 1 and 2.

Referring more particularly to Figure 1, reference numeral 1 designates a hollow box-like casting which serves as a bed for the machine typically illustrated as a grinder. Positioned directly over the bed and supported on frictionless bearings there is a table 2 which is adapted to be reciprocated in any suitable manner which is exemplified as a hydraulic motor 3. The work which is to be ground is illustrated as a block of metal 4 secured to the table in any suitable manner. A grinding wheel 5 is positioned above the metal block, this grinding wheel being actuated preferably by an electric motor (not shown). The wheel is illustrated as entering the workpiece 4 for a distance below the top surface of the workpiece, the character of the work being such that the wheel is grinding a groove or spline in the workpiece.

The table 2 is caused to be moved back and forth by a hydraulic cylinder 6 which extends along the upper surface of the base 1 and is suitably supported thereon, as illustrated, by the lugs 7. The cylinder 6 contains a double-acting piston 8 secured to one end of a piston rod 9, this rod being adapted to slide in suitable bearings provided within the cylinder 6. The rod is fixedly secured to an angle piece 10 by the nuts 11, which angle piece is rigidly mounted on the table 2. Thus as pressure fluid is alternately admitted to each side of the piston 8 the rod 9 is moved first in one direction and then in the other to carry the table 2 and the workpiece 4 past the grinding wheel 5.

In order to reverse the table at each end of its stroke, a pair of dogs 12 is suitably positioned on the side of the table, these dogs being preferably carried on a slide 13 on which they are adjustably mounted. The dogs successively strike a lever 14 which makes suitable adjustments within a hydraulic system, described hereinafter, in order to cause the admission of pressure fluid first to one side of the piston 8 and then to the other side, thus moving the table 2 in a reciprocatory manner. It is apparent that the table 2 is usually quite heavy, and in the case of a grinder may move in the left and right-hand directions at a fairly fast rate. Thus the momentum of the table is considerable at the time the dogs 12 strike the lever 14 for reversal of movement. In case the grinding wheel is working on a so-called "blind" spline or slot, in which the spline is open only at one end, it is absolutely necessary that there shall be not the slightest over-travel of the table but that the machine will reverse its operation the instant the grinding wheel reaches the end of the spline or groove. This criticalness in the point of table reversal is even more pronounced when obstructions are on the table, for example a wheel dresser, which is usually so positioned that when there is a small amount of over-travel the obstruction may strike the wheel and cause severe damage. The present invention is directed more especially to an improved hydraulically-actuated system, which automatically provides for a retardation in the movement of the table immediately before the point of reversal so that when the table reaches this point its speed of movement is relatively small and there is no danger of over-travel.

*Improved hydraulic circuit*

The hydraulic circuit is contained entirely within the bed 1. The primary source of fluid pressure consists of an oil pump 15 which may be actuated by a three-phase electric motor, as indicated by the three conductors 16, 17 and 18. These conductors are connected through electric switch gear 19 to a source of three-phase current indicated by the wires 20, 21 and 22. The details of the switch gear form no part of the present invention but for the sake of completeness of disclosure will be described under a separate heading.

The bottom of the base 1 contains a supply of oil or other substantially incompressible fluid. A conduit 23 leads from this oil supply to the suction side of the pump 15. A pipe 24 is taken from the high pressure side of the pump to a control valve mechanism 25. From this mechanism there extends two pipes 26 and 27, the pipe 26 being connected to a so-called "master valve" 28 which controls the admission of pressure fluid to the opposite sides of the piston 8. The pipe 27 is connected through suitable valves and conduits (not shown) to a cylinder and contained piston for moving the grinding wheel 5 crosswise of the workpiece. Inasmuch as this mechanism for crosswise movement is well known in the art, no illustration or description is necessary although in Figure 2 a view of the parts of the mechanism has been shown. It will be understood that this illustration of the parts of this mechanism and the following description thereof has reference to details of the crosswise movement of the grinding wheel contemplated for use with the hydraulic circuit of Figure 1, as well as that shown in Figure 2.

Referring to Figure 2, the wheel 5 is contained within a circular guard 29 and is carried on a slide 30 provided with beveled edges. This slide is adapted to move within a pair of oppositely positioned V-shaped grooves provided in a saddle 31 which forms part of a carrier 32. The tongue 30 may be moved with respect to the saddle 31 by means of a hydraulic cylinder and piston contained within the saddle, and connections are made between the control valve 25 and the cylinder through the pipe 27. The tongue 30 may also be moved manually, if desired, by means of a hand wheel 33, in which case the hydraulic motor is locked out by means of a lever 34. The carrier 32 is adapted to slide upwardly and downwardly on a column upright 35 to which it is suitably gibbed, as is well known in the art, in order to control the height of the grinding wheel with respect to the workpiece. The control valve mechanism 25 (Figure 1) is provided with a pair of hand-operated levers 36 and 37, the lever 36 controlling the admission of pressure fluid to the conduit 27 in order to regulate the admission of pressure fluid to the cylinder which moves the tongue 30 (Figure 2) in the transverse direction. The member 37 is the so-called "table-control lever" and is usually provided with three positions, i. e. continuous feed, intermittent feed and the unloading position for controlling the movement and direction of flow of pressure fluid through the pipe 26.

The master valve 28 is of the standard and well known type, having a movable valve member which terminates at the ends in a pair of pistons (not shown) contained within the chambers 38, 39. Pressure fluid is supplied alternately to these pistons through a pair of conduits 40, 41 which are connected to an auxiliary valve 42 of any well known and suitable type. A conduit 43 is taken from the center of the valve 42 and connected with the pipe 24. The valve 42 is provided with a reciprocatory valve member or spool (not shown), to which a rod 44 is connected. This rod is pivotably secured to the lever 14. The latter is pivoted at 45, and the arrangement is such that as either of the dogs 12 strikes the lever the valve member within the auxiliary valve 42 is caused to move to the right or left and thus to supply pressure fluid either to the conduit 40 or the conduit 41. Consequently, as the lever 14 is moved in this manner the valve member in the main valve 28 is actuated toward the right or left, depending on the direction in which the lever 14 is actuated by the dogs 12 on the table. Conduits 46 and 47 are connected to the main valve 28, and so arranged that as the valve element is moved to the right or left, in the manner described hereinbefore, pressure fluid from the pipe 26 is delivered to the conduit 46 or the conduit 47 in order to move the table-actuating piston 8 either to the right or left. It will be understood that when one of these conduits is acting as a pressure supply the other conduit is serving to conduct exhaust fluid from the opposite side of the piston 8. The exhaust from either side of the piston 8 is taken through one of a pair of pipes 48 which connect with a common pipe 49, the last-mentioned pipe terminating in a branched line, one branch of which is connected to a so-called "retarding valve" 50 and the other passes through a needle valve 51 to the oil reservoir.

The present invention is directed more especially to the retarding valve 50, particularly to its position within the hydraulic circuit and the relation of the associated valves therewith. The purpose of the retarding valve is automatically to slow down the movement of the table-actuating piston 8 at a predetermined point in the travel of the table in order to prevent over-travel. The valve 50 may comprise a cylindrical casing 52 having closure or end plates 53 and containing a valve element 54 of the spool type, with pistons 55 and 56 at opposite ends thereof. A pipe 57 is taken from the upper end of the valve casing 52 to a solenoid-operated pilot valve 58. The pilot valve contains a spool valve element 59, to which is connected a rod 60 terminating in an armature (not shown) which forms the movable core of an electromagnet indicated at 61. The valve member 59 is provided with a pair of pistons 62, 63, and as shown the conduit 57 connects with the valve casing at a position just above the upper piston 62.

A conduit 64 is taken from the valve casing at a position between the pistons 62, 63, through a needle valve 65 to the lower end of the retarding valve 50. The high pressure conduit 24 connects with the casing of the valve 58 at a position between the pistons 62, 63, and preferably on the opposite side of the casing from the conduit 64. An exhaust conduit 66 is connected between the upper portion of the valve casing 58 and the oil reservoir. A pipe 67 is also taken from the oil supply through a valve 68 to a pipe 69, which connects with the interior of the retarding valve 50 between the two pistons 55 and 56, as shown. The pipe 67 has an extension 70 which terminates in branches 71 and 72 to provide exhaust passageways for each end of the auxiliary valve 42. It will be understood in this connection that when pressure fluid is supplied to either of the pipes 40 and 41 upon actuation of the auxiliary valve 42, in the manner described heretofore, the opposite end of the valve 42 is exhausted through either the pipe 72 or the pipe 71, respectively to the tank reservoir. In order to protect the pump 15 and the associated hydraulic system from excessive pressure, a relief valve 73 may be shunted around the pump by means of the pipe 74.

Assume that the solenoid 61 is energized in the manner to be described presently, and the pump 15 is supplying high pressure fluid to the pipe 24. The valve element 59 of the pilot valve 58 is drawn upwardly, as shown, and pressure fluid passes through the pilot valve, from the pipe 24 to the pipe 64 of the retarding valve 50. The spool valve element 54 of the retarding valve is therefore forced upwardly in the position shown in the drawing. Now assume that the lever 37 has been moved to one of its three positions such that pressure fluid from the pipe 24 is admitted to the pipe 26 of the main or master valve 28. Still further assume that the lever 14 has been previously moved to one of its extreme positions by one of the dogs 12 on the table. Under these conditions high pressure fluid will pass through the auxiliary valve 42, and let us assume that the valve member therein has been moved to such a position as to permit high pressure fluid to move through the conduit 40 into the master valve 28. A path is therefore provided through the master valve to the pipe 46, for example, so that high pressure fluid is admitted to the left side of the piston 8, thus moving the table from left to right. Under these conditions the right-hand branch 48 of the pipe 49 receives the fluid exhausted by the master valve, and this fluid will pass in part through the retarding valve 50 to the exhaust conduit 69, or through the needle valve 51 directly to the reservoir. It is apparent that by controlling the needle valve 51, any desired portion of the exhaust fluid may pass through the retarding valve 50, and additional control is exercised at the needle valve 68. Consequently, as little or as much exhaust fluid may be passed through the retarding valve 50 as is desired, and inasmuch as this exhaust fluid originates from the side of the piston 8 opposite the pressure side, any degree of escape of the fluid may be obtained and the piston may therefore be retarded in any desired amount. The operation of the valve element 54 in the retarding valve may also be such as completely to shut off the connection between the conduits 49 and 69, and assuming that the needle valve 51 is also shut, no pressure fluid will escape from the exhaust side of the piston 8. Thus the piston may be retarded in its movement to a much greater degree.

The initiation of the complete stoppage of exhaust fluid is effected at the pilot valve 58 under conditions which will be explained presently. Assume for the moment that the solenoid 61 is deenergized and that the valve element 59 has dropped to its lowermost position. The piston 62 in the pilot valve will now have moved to an intermediate position between the pipes 24 and 64, thus preventing further admission of pressure fluid to the pipe 64. Pressure fluid is now moving between the pipe 24 and the pipe 57, which causes the valve element 54 in the retarding valve 50 to be shifted downwardly. The piston 55 of the last-mentioned valve will now have moved to such a position as completely to cut off communication between the pipes 49 and 69, so that the only fluid which may be exhausted through the pipe 49 is that which passes through the valve 51. However, the latter may be controlled entirely to shut off the exhaust fluid or to admit any desired amount of the fluid.

It is apparent that the oil or other fluid which is trapped on the exhaust side of the piston 8 in this manner serves as a retarding buffer for the piston, and the further the piston moves in the direction of the trapped fluid the greater will be the back pressure exerted by this fluid on the piston, until eventually the piston is caused to come to a complete stop, ready for reversal. The point in the table travel at which the retarding effects are so great as completely to stop the table should preferably be the same point which defines the extreme limit of table travel as determined by the length of the spline or slot being ground in the workpiece 4. At this moment (assuming now that the table has moved to the right to its limit of travel, as explained above) the left-hand dog 12 will now contact the lever 14, shifting it to the other side of its neutral position. Fluid pressure will be admitted from the pipe 24 through the master valve 28, to the pipe 47 in order to cause the piston 8 to move from right to left. The opposite or left-hand side of the piston is now open to exhaust through the pipe 46, through the master valve 28 and the pipe 49, and through either or both of the retarding valve 50 and the needle valve 51, depending on whether the solenoid 61 is energized or deenergized. It is apparent that the retarding valve 50 is always connected on the exhaust side of the table-actuating cylinder 6, regardless of the direction in which the piston 8 is being moved. While I have shown the master valve being hydraulically operated through the auxiliary valve 42, it is apparent that if desired the master valve could be operated directly by the lever 14 in case the size of the valve is such as to lend itself to direct or mechanical operation. In order to control the position at which the retarding effects provided by the valve 50 take place along the travel of the table, a pair of adjustably positioned cams 75 is secured to the table and preferably mounted in the same grooves which hold the dogs 12 in place. These cams are provided with inclined inner and lower surfaces 76 which are adapted to depress a plunger 77 of a switch 78 suitably positioned on the bed of the machine.

*Electrical circuit for controlling the operation of the solenoid pilot valve and the main pump motor*

The switch 78 is normally closed, and is adapted to be opened only when one or the other of the inclined surfaces 76 strikes the plunger 77. The switch contacts are connected through conductors 79 and 80 to a solenoid contactor structure, indicate generally by the dot-dash rectangle 81. This contactor includes a solenoid 82 provided with a movable armature 83 which carries a plate 84. There is provided at the ends of the plate 84 a pair of structural elements 85 which are insulated from the plate 84 and have a pair of branches which carry switch contacts 86, 87, 88 and 89. These contacts are adapted physically to engage contacts 90, 91, 92 and 93, respectively, when the solenoid 82 is energized and the plate 84 is caused to move upwardly. The conductor 79 is connected to one end of the solenoid 82 and the other end of the solenoid is connected through conductors 94, 95 to the switch terminal 92. The terminals 86 and 87 are connected together, as are also the terminals 88 and 89. The terminal 91 is connected through a conductor 96 to one side of the solenoid 61 of the pilot valve, and the other side of the last-mentioned solenoid is connected through a conductor 97 to the switch terminal 93.

The starter comprises a solenoid 98 provided with a movable core (not shown), to which are secured three electrically independent metal armatures 99, 100 and 101. These armatures are adapted, when closed, to make contact with three pairs of electrical terminals, one pair being designated 102, 103, another pair 104, 105 and the last pair 106, 107, respectively. A conductor 108 is taken from the terminal 102, through a pair of overload relays 109 to the solenoid 98, then through a conductor 110 to one of a pair of switch contacts 111, the other of the switch contacts being connected through a conductor 112 to the left-hand terminal 113 of a starting switch 114. The right-hand terminal 115 of the starting switch is connected through a conductor 116 to the right-hand terminal 117 of a stop switch 118. The left-hand terminal 119 of the stop switch 118 is connected through a conductor 120 to one of the electric mains 22. The middle main 21 is connected to the contact 104, and the remaining main 20 is connected to the contact 102. The wire 94 leading from the solenoid 82 is connected to the terminal 105. A conductor 121 is also taken from the terminal 105, through a circuit breaker or fuse 106 to the wire 17 which leads to the electric motor operating the pump 15. The wire 16 of the pump motor is connected to the contact member 107. The wire 18 of the pump motor is taken through a circuit breaker or fuse 124 to the switch terminal 103, and a wire 125 is also connected between the switch terminal and the conductor 80. A conductor 126 is connected between the wire 116 and the right-hand contact of a terminal pair 127, the other terminal of which is connected through the conductor 128 with one of the terminals 111. An armature 129 is adapted to move in the vertical direction between each pair of contacts 111 and 127, this armature being under the control of the solenoid 98 and normally resting on the contacts 111 to close the circuit through the conductor 112.

*Operation of electrical system*

When it is desired to start the pump motor the starting switch 114 is first depressed and a circuit is established from the mains 22, the conductor 120, stop switch 118, conductor 116, starting switch 114, conductor 112, armature 129, solenoid 98, overload relays 109 back to the other mains 20. The solenoid will then become energized and will cause the armatures 99, 100 and 101 to make contact with their respective pairs of switch terminals 102, 103, also 104 and 105, and finally 106 and 107. A circuit for the pump motor will be established from the main line 20, through armature 99, through fuse 124 and to conductor 18. The circuit of the main line 21 is established through the armature 100, conductor 121, fuse 106, to the line 17. The last line 22 of the three-phase circuit is completed through the armature 101 to the conductor 16. Consequently, when the button of the starting switch 114 is depressed the pump motor will be immediately energized.

Inasmuch as the switch 114 makes only temporary contact with the terminals 113 and 115 (while being depressed by the finger), a holding circuit must be established to maintain the energization of the solenoid 98. When the latter becomes energized the armature 129 is moved upwardly against the contacts 127 so that a holding circuit is now established from the mains 22, through the stop switch 118, through the armature 129 (in its upper position), through the conductor 110, solenoid 98, overload relays 109, conductor 108 to the other mains 20. In order to stop the motor it is only necessary to depress the stop switch 118, which will break the holding circuit and thus deenergize the solenoid 98. The circuit for the protective switch 78 may be traced from the terminal 103, through the conductor 125, switch 78, through the conductor 79 to the solenoid 83, through the conductor 94 to the terminal 105 and the armature 121, back to the middle mains 21. Thus when the solenoid 98 is energized the solenoid 82 is also energized, and the switch is effectively in series with the last-mentioned solenoid.

The circuit for the solenoid 61 of the pilot valve 58 may be traced from the switch terminal 103, through the conductor 125, conductor 80, through the switch contacts 86 and 87 in series, to the conductor 96, through the solenoid 61 to the conductor 97 and through the switches 89 and 88 in series to the conductor 95, back to the switch terminal 105. Inasmuch as the solenoid 82 is energized when the starter button 114 is pressed, as described hereinbefore, the switches 86, 87, 88 and 89 are closed and the solenoid 61 becomes energized. As explained hereinbefore, when the solenoid 61 is energized the valve 59 is in its upper position, as shown in Figure 1, high pressure fluid is admitted to the retarding valve 50 to raise the valve element 54 and thus to permit exhaust fluid from the cylinder 6 to drain into the tank.

Assume now that the table 2 has almost reached the end of its stroke so that it is desired to retard further movement of the table preparatory to reversing the table, in the manner described hereinbefore. One of the inclined surfaces 76 of the cams 75 will strike the plunger 77 and will open the switch 78 to cause deenergization of the solenoid 82. The switch contacts 86, 87, 88 and 89 will be moved away from their adjacent contacts 90, 91, 92 and 93, respectively, thus opening the circuit of the solenoid 61 of the pilot valve 58. Under these conditions the valve element 59 will be moved downwardly to permit pressure fluid to pass from the pipe 24 into the pipe 57, and to cause the valve element 54 to drop. The piston 55 closes communication between the pipes 49 and 69, and assuming that the valve 51 is closed, no fluid is permitted to be exhausted by the piston 8. Thus the movement of the piston is retarded in any desired degree by adjusting the valve 51, finally causing the piston to come to a halt ready to be reversed by the action of the dogs 12 on the lever 14. The operation of the improved system is therefore such that the retarding effects of the valve 52 are obtained either automatically by means of the cams 75 at predetermined fixed positions, or at any desired position throughout the travel of the table 2 by manually or otherwise opening the switch 78. The degree of this retardation may be adjusted at the valve 51, and to some extent by operating the needle valve 65 which controls the speed with which the valve element 54 is moved within its cylinder 59.

The system shown in Figure 2 is somewhat similar to that shown in Figure 1 except that a hydraulic valve is substituted for the electric switch 78, and the solenoid 82 with its immediately associated switch gear has been eliminated. This hydraulic valve is shown at 130 and comprises a casing 131 containing a spool valve element 132. The valve element is provided with valve portions 133, 134 and 135, and carries at one end a pin 136 surrounded by a compression spring 137. The valve element 132 at the other end is provided with a pin 138 which projects through the casing 131 and is adapted to be engaged by the lower leg 139 of a bellcrank lever pivoted at 140 and provided at its upper end with a roller 141. This roller is adapted to be contacted by the inclined surfaces 76 of the cams 75 so that the valve element 132 may be shifted to the left against the action of the spring 137, or be permitted to assume the position shown in Figure 2, depending on which of the two inclined surfaces had contacted the roller 141. Those elements appearing in Figure 2 which find a counterpart in Figure 1 have been given similar reference numerals. It will be noted that the conduit 57 which communicates with the upper end of the slow-down valve 50 is connected to the casing 131 on one side of the middle flange 134, while the conduit 64 which communicates with the lower end of the slow-down valve 50 is connected to the valve casing 131 on the other side of the middle flange 134. Exhaust conduits 142 communicate with the trip valve 131 at opposite ends of the casing, these conduits being brought to a single drain pipe 143.

The operation of the system shown in Figure 2 is somewhat similar to that explained at length in connection with Figure 1 except that the movement of the valve member 54 in the slow-down valve 50 is controlled hydraulically by pressure fluid flowing either through the pipe 57 or the pipe 64, depending on the position of the valve element 135 of the trip valve 131. In the position illustrated in Figure 2 high pressure fluid from the pipe 24 passes through the trip valve 131 to the pipe 64, and causes the valve member 54 of the slow-down valve 50 to move upwardly as shown, thus permitting exhaust fluid within the cylinder 3 to flow through the pipe 49, through the valve 50 into the exhaust pipe 69. The amount of fluid by-passed through the slow-down valve is controlled by the needle valve 51, which is also connected in a pipe leading to the tank. However, when it is desired to introduce a retarding effect on the piston 8 the inclined surface 76 of the left-hand cam 75 is caused to contact the roller 14, pushing the pin 138 to the left and also moving the valve element 135 to the left. Under these conditions high pressure fluid is supplied from the pipe 24 to the pipe 57, causing the valve element 54 of the retarding valve 50 to move downwardly and thus to close off the passage between the pipes 49 and 69. Thus no exhaust fluid is permitted to pass through the slow-down valve, and back pressure is developed on the exhaust side of the piston 8 to retard the movement of the table 2.

In Figure 3 there is shown a modification in which the retarding valve 50 is positioned in the high pressure fluid line between the pump 15 and the cylinder 3. A conduit 144 is connected between the high pressure side of the pump 15 and the retarding valve 50, the discharge line 145 of which is connected through the master valve 28 to the exhaust conduits 48 which lead to the exhaust pipe 146. As in the case of Figures 1 and 2, the master valve may be operated either hydraulically through an auxiliary valve 42 (shown in Figures 1 and 2), and conduits 46 and 47 may be taken to the opposite sides of the cylinder 3 to conduct pressure fluid toward and away from the cylinder 3 as in the case of the other figures. Either the switch 78 (Figure 1) together with the solenoid pilot valve 58 or the mechanically operated valve 131 (Figure 2), which are actuated by cams secured to the table, may be provided to initiate the operation of the retarding valve 50 and thus to determine whether or not high pressure fluid is permitted to pass through the retarding valve. In case the valve 50 is completely closed off, small amounts of fluid may still be transmitted through the needle valve 147 so that a complete control is exercised over the pressure fluid which passes through the master valve and flows either through the pipe 46 or the pipe 47, into the cylinder 3. It will be apparent in Figure 3 that the retarding valve 50 in this case serves to control the amount of fluid which is supplied to the pressure side of the piston 8, and assuming that the pressure fluid on the exhaust side of the piston exerts a constant back pressure, the speed with which the piston moves will decrease as the pressure fluid through the retarding valve 50 is caused to decrease or to be entirely shut off.

It will be understood that I desire to comprehend within my invention such modifications as come within the scope of the claims.

Having thus described my invention, what I claim as new and desire to secure by Letters Patent, is:

1. A machine comprising a shaping tool and a reciprocatory table for carrying work past said tool, a hydraulic cylinder and piston for moving said table, a source of fluid contained in a tank and a pump for applying pressure to said fluid, a master valve for controlling the passage of pressure fluid to and from said cylinder, a table-retarding valve having a movable member, said valve being connected to said master valve for receiving fluid exhausted by said cylinder and for controlling the amount of fluid exhausted from said cylinder, an exhaust line leading from the master valve to the tank, said line having a connection to said retarding valve means initiated when the table has reached a predetermined position in its travel for actuating the movable member of said retarding valve in order to control the amount of exhausted fluid, and a by-pass containing a hand-operated valve connected to the opposite ends of the table retarding valve for restricting the passage of fluid from the retarding valve to said tank.

2. A machine comprising a shaping tool and a reciprocatory table for carrying work past said tool, a hydraulic cylinder and piston for moving said table, a source of fluid contained in a tank and a pump for applying pressure to said fluid, a master valve for controlling the passage of pressure fluid to and from said cylinder, a table-retarding valve having a movable member, said valve being connected to said master valve for receiving fluid exhausted by said cylinder and for controlling the amount of fluid exhausted from said cylinder, an exhaust line leading from the master valve to the tank, said line having a connection to said retarding valve means initiated when the table has reached a predetermined position in its travel for actuating the movable member of said retarding valve in order to control the amount of exhausted fluid, and a by-pass containing a hand-operated valve connected to the opposite ends of the table retarding valve for restricting the passage of fluid from the retarding valve to said tank, a combined electrical hydraulic valve having a hydraulic connection to said retarding valve for controlling the movements of the movable valve element thereof, said means comprising a switch operable by a cam on said table for controlling the combined electrical-hydraulic valve which in turn controls the condition of said retarding valve, whereby said cam by its operation of said electrical-hydraulic valve may control the position at which the retarding effects of said retarding valve may take place along the travel of said reciprocatory table.

3. A machine comprising a shaping tool and a reciprocatory table for carrying work past said tool, a hydraulic cylinder and a piston for moving said table, means including a pressure pump and a source of fluid for actuating said piston, a master valve for controlling the passage of pressure fluid to and from said cylinder, a table-retarding valve having a movable element, said valve being connected to said master valve for receiving fluid exhausted by said cylinder, means dependent on the relative position of the table with respect to said tool for controlling the condition of said retarding valve, and the position of the movable element thereof an exhaust line connected between said retarding valve and said source of fluid, and a bypass connected to the opposite ends of the table retarding valve having a manually-operated valve to by-pass any desired quantity of exhaust fluid to said retarding valve whereby the retarding effects exerted on said table through said piston are manually controlled.

4. A grinding machine comprising an abrasive wheel and a reciprocatory table for carrying the work past said wheel, a hydraulic cylinder and piston for moving said table, a source of pressure fluid for actuating said piston, means for retarding the movement of said piston and table, said means including a throttling valve connected to the exhaust line from the cylinder to receive and control the passage of fluid as it is exhausted by said piston, said throttling valve provided with means for hydraulically operating the same and containing a valve member having pistons at the ends, a hydraulic valve provided with means for operating the same when the table has reached a predetermined point in its travel, and hydraulic connections between the last-mentioned valve and the pistons of the throttling valve whereby the condition of the throttling valve is changed when the table has reached said predetermined position in its travel.

5. A grinding machine comprising an abrasive wheel and a reciprocatory table for carrying the work past said wheel, a hydraulic cylinder and piston for moving said table, a source of pressure fluid for actuating said piston, a tank, means for retarding the movement of said piston and table, said means including a throttling valve having pistons subject to hydraulic pressure movable therein, said valve being connected to the exhaust side of the cylinder to receive and control the passage of fluid as it is exhausted by said piston, an electrically controlled hydraulic valve for operating the latter, said hydraulic valve being provided with means for operating the same when the table has reached a predetermined point in its travel, hydraulic connections between the last-mentioned valve and the pistons of the throttling valve whereby the condition of the throttling valve is changed when the table has reached said predetermined position of travel, and a by-pass containing a hand-operated valve connected between the throttling valve and the tank for controlling the effects of said throttling valve.

6. A grinding machine comprising a shaping tool and a reciprocatory table for carrying work past said tool, a hydraulic cylinder and piston for moving said table, a source of fluid contained in a tank and a pump for applying pressure to said fluid, a master valve for controlling the passage of pressure fluid to and from said cylinder, a table-retarding valve connected to said master valve for receiving fluid exhausted by said cylinder, an electrically controlled hydraulic valve and connections between said valve and said pump and between said valve and said table-retarding valve for operating the latter, means initiated when the table has reached a predetermined position in its travel to operate through circuit closing devices and electrical connections said electrically controlled hydraulic valve to effect operation of the table-retarding valve, and a by-pass containing a hand-operated valve connected between said retarding-valve and the tank for controlling the effects of said retarding valve.

WILLIAM G. BALDENHOFER.